(12) United States Patent
Mao et al.

(10) Patent No.: US 11,514,225 B2
(45) Date of Patent: Nov. 29, 2022

(54) VERIFICATION PLATFORM FOR SYSTEM ON CHIP AND VERIFICATION METHOD THEREOF

(71) Applicant: MONTAGE LZ TECHNOLOGIES (CHENGDU) CO., LTD., Sichuang (CN)

(72) Inventors: Huimin Mao, Chengdu (CN); Shunlin Li, Chengdu (CN); Chengqiang Liu, Chengdu (CN)

(73) Assignee: MONTAGE LZ TECHNOLOGIES (Chengdu) Co., Ltd., Chengdu (CN)

( * ) Notice: Subject to any disclaimer, the term of this patent is extended or adjusted under 35 U.S.C. 154(b) by 42 days.

(21) Appl. No.: 17/363,653

(22) Filed: Jun. 30, 2021

(65) Prior Publication Data
US 2021/0406442 A1 Dec. 30, 2021

(30) Foreign Application Priority Data
Jun. 30, 2020 (CN) .......................... 202010618069.6

(51) Int. Cl.
*G06F 30/398* (2020.01)
*G06F 30/3308* (2020.01)
(Continued)

(52) U.S. Cl.
CPC ........ *G06F 30/398* (2020.01); *G06F 30/3308* (2020.01); *G01R 31/28* (2013.01);
(Continued)

(58) Field of Classification Search
CPC .... G06F 30/398; G06F 30/3308; G06F 30/20; G06F 30/367; G06F 2115/02; G06F 11/00; G01R 31/28
(Continued)

(56) References Cited

U.S. PATENT DOCUMENTS

| | | | | |
|---|---|---|---|---|
| 6,212,489 B1 * | 4/2001 | Klein | ...................... | G06F 9/455 716/117 |
| 8,214,805 B2 * | 7/2012 | Stewart | ............... | G06F 11/3664 717/124 |

(Continued)

FOREIGN PATENT DOCUMENTS

| | | | | | |
|---|---|---|---|---|---|
| CN | 104899138 A | | 9/2015 | | |
| CN | 105354121 A | * | 2/2016 | .............. | G06F 11/26 |

(Continued)

OTHER PUBLICATIONS

Rashinkar et al., "System-on-chip Verification Methodology and Techniques", Kluwer Academic Publishers, 2002, 393 pages. (Year: 2002).*

*Primary Examiner* — Phallaka Kik
(74) *Attorney, Agent, or Firm* — Oliff PLC

(57) ABSTRACT

The present application discloses a verification platform for a system on chip and a verification method thereof, the method comprises: constructing a simulation verification environment for the system on chip; creating a bus function model unit, and binding the bus function model unit to the same interface at which a central processing unit being connected to the bus; creating an Universal Verification Methodology test instance, and performing the Universal Verification Methodology test instance by the bus function model unit to implement the system on chip test; creating a plurality of software test instances; and compiling the software test instances, and performing the compiled software test instances by the central processing unit to implement the system on chip test.

10 Claims, 2 Drawing Sheets

(51) Int. Cl.
  *G06F 30/20* (2020.01)
  *G06F 30/367* (2020.01)
  *G06F 11/00* (2006.01)
  *G01R 31/28* (2006.01)
  *G06F 115/02* (2020.01)

(52) U.S. Cl.
  CPC .............. *G06F 11/00* (2013.01); *G06F 30/20* (2020.01); *G06F 30/367* (2020.01); *G06F 2115/02* (2020.01)

(58) Field of Classification Search
  USPC ....... 716/106, 111, 136; 703/16, 17; 714/30, 714/33, 732, 733, 734, 741
  See application file for complete search history.

(56) References Cited

U.S. PATENT DOCUMENTS

| | | | | |
|---|---|---|---|---|
| 2004/0162805 | A1* | 8/2004 | Wozniak | G06F 30/33 |
| 2014/0032204 | A1* | 1/2014 | Suresh | G06F 11/3652 |
| | | | | 703/23 |
| 2016/0103723 | A1* | 4/2016 | Hasan | G06F 11/261 |
| | | | | 714/33 |
| 2021/0224684 | A1* | 7/2021 | Sarkar | G06F 3/0638 |

FOREIGN PATENT DOCUMENTS

| | | | | |
|---|---|---|---|---|
| CN | 109684672 A | | 4/2019 | |
| CN | 109783298 A | | 5/2019 | |
| CN | 107907814 B | * | 3/2020 | ......... G01R 31/2851 |
| KR | 100638476 B1 | * | 10/2006 | ............. G06F 30/33 |

* cited by examiner

VERIFICATION PLATFORM FOR SYSTEM ON CHIP AND VERIFICATION METHOD THEREOF

REFERENCE TO RELATED APPLICATION

This application claims priority to Chinese Application number CN2020106180696, filed on Jun. 30, 2020, the contents of which are incorporated herein by reference.

TECHNICAL FIELD

The present application generally relates to the field of simulation verification technology, and more particularly to a verification platform for a system on chip and a verification method thereof.

BACKGROUND

SoC (system on chip) technology refers to a technology for integrating all system techniques and corresponding components (such as one or more of: central processing unit(s), bus(es), memor(ies), IP (Intellectual Property) core module(s), Input/Output (I/O) peripheral(s), etc.) into a single chip to provide a system. SoC technology can effectively reduce product area, improve product performance, reduce product power consumption and improve product reliability, so it has been widely used. However, due to the high cost of the chip, in order to ensure the functionality and performance of the SoC chip, there is a need of a large amount adequate verification before chip taping out.

There are two verification methods for the SoC chip in the prior art. One method is to perform test through the CPU, which needs technicians to implement software code, CPU booting and other processes in the verification platform in advance, and then start the simulation. This verification method requires each verification engineer to have an in-depth understanding of the CPU, especially the assembly language. Moreover, it may take a certain amount of time for the development of software code, the CPU booting and other processes, so the start of verification is delayed. When the CPU executes the software code, it has to firstly run the same booting process before starting the test program, which affects the verification progress. The other method is to perform test through Universal Verification Methodology Cases, which cannot reuse software test program.

SUMMARY OF THE INVENTION

An object of the present application is to provide a verification platform and verification method for a system on chip, which provides a flexible simulation method to shorten the verification cycle.

An embodiment of the present application discloses a verification platform of a system on chip, the platform comprises: at least one test module, wherein each test module comprising a central processing unit, a bus function model unit and an Universal Verification Methodology test instance, the central processing unit being connected to the bus, the bus function model unit being bound to an interface via which the central processing unit is connected to the bus; wherein the Universal Verification Methodology test instance implements a test through the bus function model unit, and the software test instance implements a test through the central processing unit or through the bus function model unit and a direct programming interface.

In an embodiment, the verification platform further comprises a first selection switch, wherein one of the central processing unit and the bus function model unit is selectively connected or bound to an interface of the bus through the first selection switch.

In an embodiment, the verification platform further comprises a second selection switch, wherein one of the direct programming interface and the Universal Verification Methodology test instance is selectively connected to the bus function model unit through the second selection switch.

In an embodiment, the system on chip comprises one or more central processing units, a plurality of IP core modules and the bus, wherein each of the IP core modules is respectively connected to the bus, the one or more central processing units are connected to the bus.

Another embodiment of the present application also discloses a verification method of a system on chip, the method comprises:

constructing a simulation verification environment for the system on chip;

creating a bus function model unit, and binding the bus function model unit to the same interface via which a central processing unit is connected to the bus;

creating an Universal Verification Methodology test instance, and performing the Universal Verification Methodology test instance by the bus function model unit to implement the system on chip test;

creating a plurality of software test instances; and compiling the software test instances, and performing the compiled plurality of software test instances by the central processing unit to implement the system on chip test.

In an embodiment, before the step of binding the bus function model unit to the same interface at which a central processing unit being connected to the bus, further comprising: disabling the connection between the central processing unit and the bus.

In an embodiment, before the step of compiling the plurality of software test instances, and performing the compiled plurality of software test instances by the central processing unit to implement the system on chip test, further comprising: selecting the bus function model unit to perform a part of software test instances through the direct programming interface; and then compiling the remaining part of the software test instances and performing the compiled remaining part of software test instances by the central processing unit.

In an embodiment, when the Universal Verification Methodology test instance is performed by the bus function model unit to implement the test of the system on chip, establishing connection between the direct programming interface and the bus function model unit to perform a part of the plurality of software test instances.

In an embodiment, when selecting the bus function model unit to perform a part of the plurality of software test instances through direct programming interface, compiling the software test instances and booting the central processing unit to perform the compiled software test instances.

In an embodiment, the number of system on chip test implemented by the Universal Verification Methodology test instances is more than that implemented by the central processing unit.

In view of the above, the verification platform of a system on chip according to the present application can perform the compiled software test instances by the central processing unit, perform the software test instances through direct programming interface and bus function model unit, and perform Universal Verification Methodology test instances through bus function model unit. Different instances can be adopted and performed by the verification platform according to different requirements to ensure the coverage of verification and improve the efficiency of the verification.

BRIEF DESCRIPTION OF THE FIGURES

Non-limiting and non-exhaustive embodiments of the present application are described with reference to the following drawings, where like reference numerals refer to like parts throughout the various views unless otherwise specified.

DETAILED DESCRIPTION

Various aspects and examples of the present application will now be described. The following description provides specific details for a thorough understanding and enabling description of these examples. Those skilled in the art will understand, however, that the disclosure may be practiced without many of these details.

Additionally, some well-known structures or functions may not be shown or described in detail, so as to avoid unnecessarily obscuring the relevant description.

In order to make the objects, technical solutions and advantages of the present application clearer, embodiments of the present application will be further described in detail below with reference to the accompanying drawings.

Figure 1:
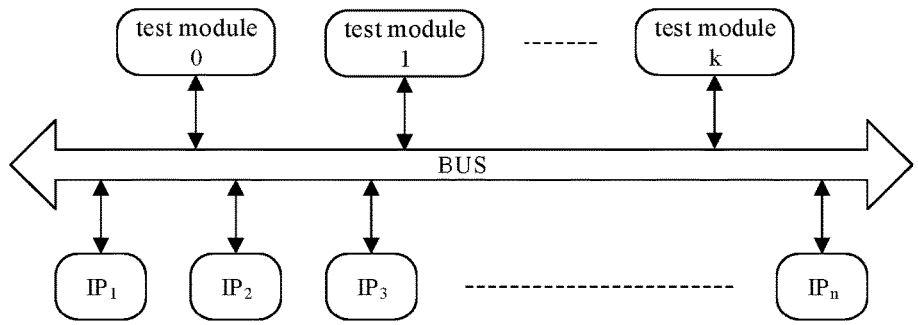
FIG. 1 shows a schematic diagram of a verification platform for a system on chip according to an embodiment of the present application.

The present application discloses a verification platform for a system on chip, and FIG. 1 shows a schematic structural diagram of the verification platform according to an embodiment of the present application. The verification platform comprises at least one test module, for example, test modules 0 to K, each test module is connected to a bus (BUS). The functional tests of the IP core modules and their combinations in the system on chip are realized through the test modules.

Figure 2:
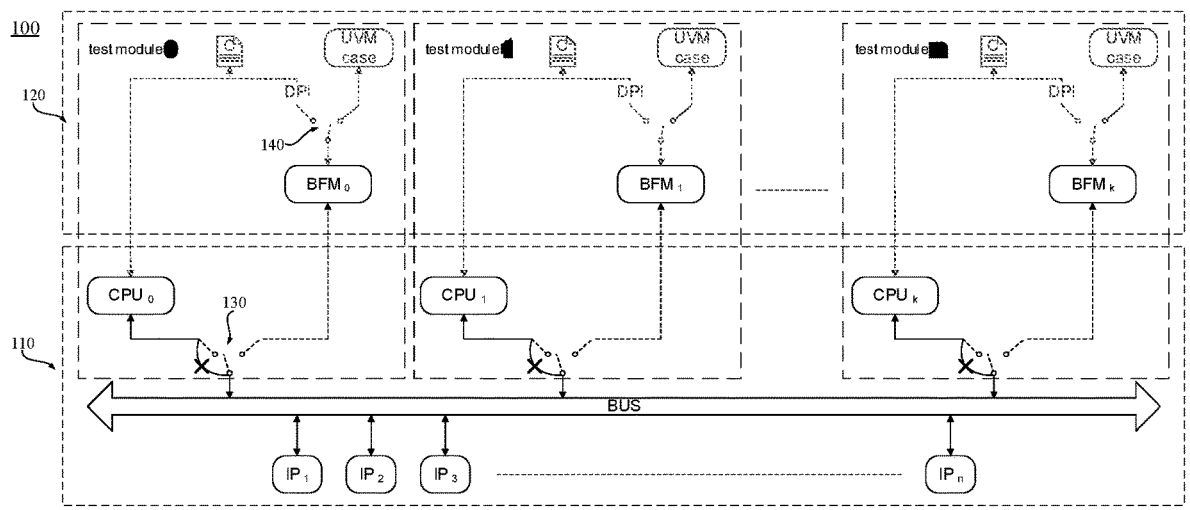
FIG. 2 shows a more detailed schematic diagram of a verification platform for a system on chip according to an embodiment of the present application.

FIG. 2 shows a more detailed schematic diagram of the verification platform 100 according to an embodiment of the present application. The verification platform 100 comprises a design to be tested 110 and a simulation environment 120. The design to be tested 110 comprises a system on chip that needs to be verified, and the functions of the system on chip 110 are tested through the simulation environment 120. The system on chip to be verified comprises central processing units (CPUs), a plurality of IP core modules (e.g., $IP_1$, $IP_2$, ..., $IP_n$) and a bus (BUS), each of the IP core modules $IP_1$, $IP_2$, ..., $IP_n$ is respectively connected to the bus, each of the IP core modules $IP_1$, $IP_2$, ..., $IP_n$ is a component with a particular function, for example, $IP_1$ is a universal serial bus (USB) controller, $IP_2$ is a video decoder, $IP_3$ is an audio Decoder, etc. It should be understood that the IP (Intellectual Property) core module is a pre-designed and verified component with a certain function for selection and integration by chip designers. Generally, there are a plurality of IP core modules integrated in a SoC. The IP core modules is not limited to the above-exemplified components, but may also be components with other specific functions, which are well-known to those skilled in the art and will not be repeated here. The system on chip to be verified may comprise one or more central processing units, for example, $CPU_0$, $CPU_1$, ..., $CPU_k$, each of the central processing units $CPU_0$, $CPU_1$, ..., $CPU_k$ is connected to the bus. The simulation environment 120 comprises software test instances, Universal Verification Methodology test instances (UVM cases) and bus function model units ($BFM_0$, $BFM_1$, ..., $BFM_k$). The software test instance is software code written in C language (C program), and the Universal Verification Methodology test instance is test code written in Universal Verification Methodology. The bus function model unit is bound to an interface via which the corresponding central processing unit is connected to the bus. The software test instance is connected to the corresponding bus function model unit by a direct programming interface (DPI). The Universal Verification Methodology test instance is connected to the corresponding bus function model unit.

In an embodiment, the verification platform 100 also comprises one or more first selection switches 130, one of the central processing unit and the bus function model unit is selectively connected or bound to an interface of the bus through the first selection switch.

In an embodiment, the verification platform 100 also comprises one or more second selection switches 140, one of the direct programming interfacs (DPI) and the corresponding Universal Verification Methodology test instance is selectively connected to the corresponding bus function model unit through the second selection switch 140.

In an embodiment, the bus function model unit is connected to the bus through a verification IP (VIP) module (not shown in the figure). Typically, the interfaces of the central processing units conform to a standard protocol, for example, the Advanced MicroController Bus Architecture (AMBA) Protocol, the Open Core Protocol (OCP), etc. The VIP module strictly follows these standard protocols and has been verified and the interface of the bus function model unit adopts the VIP, which can shorten the development time of the simulation verification environment, and at the same time can verify the correctness and completeness of the bus interface protocol.

Continuing with reference to FIG. 2, test modules 0 to k comprise the central processing units $CPU_0$, $CPU_1$, ..., $CPU_k$, the bus function model units $BFM_0$, $BFM_1$, ..., $BFM_k$ and the Universal Verification Methodology test instances, respectively. Among them, the Universal Verification Methodology test instance is tested through the bus function model unit, and the software test instance is tested through the central processing unit or through the bus function model unit via a direct programming interface (DPI), that is, there are three test paths: a UVM case path, a DPI path, and a CPU path (see in FIG. 2). In the present application, different instances can be tested through corresponding paths, which is very useful in complex SoC verification, and complex test scenarios can be constructed for verification according to test requirements, for example, extreme and boundary verification can be constructed.

Figure 3:
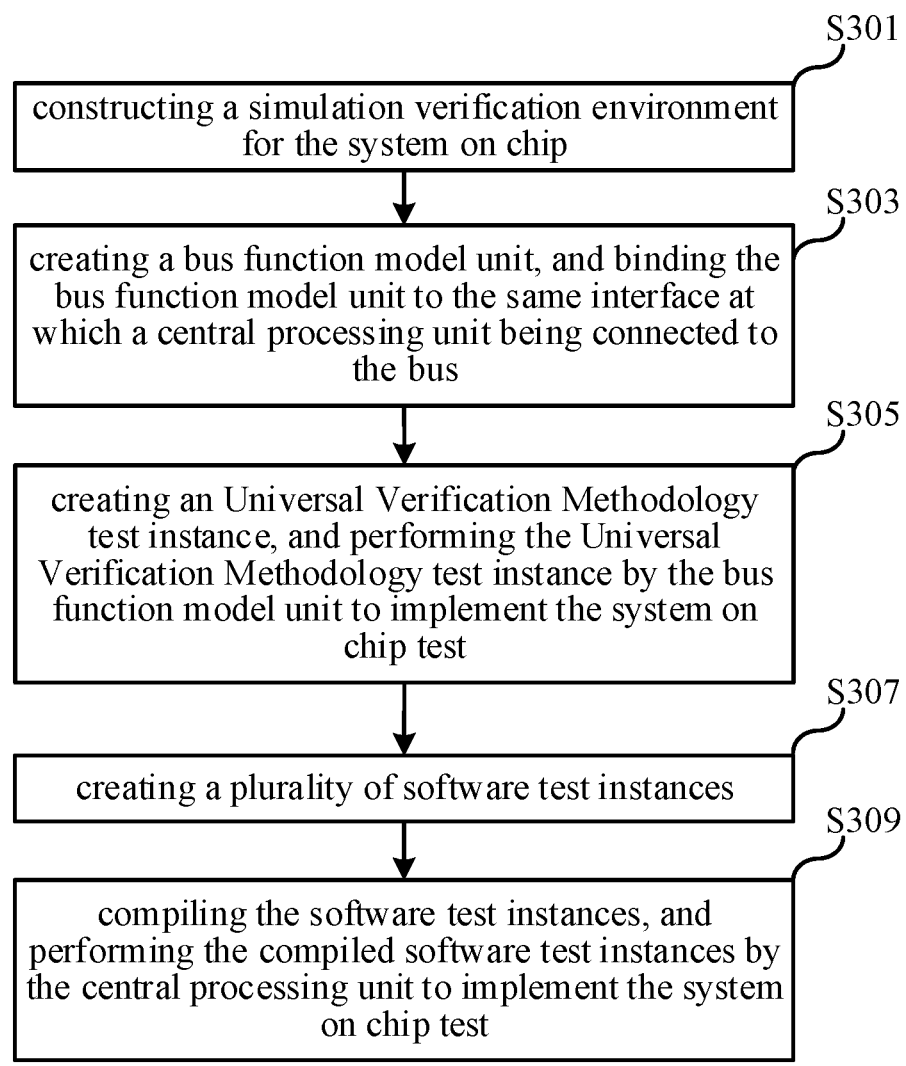
FIG. 3 shows a flow chart of a verification method for a system on chip according to an embodiment of the present application.

Another embodiment of the present application also discloses a verification method for a system on chip, and FIG. 3 shows a flow chart of a verification method for a system on chip according to an embodiment of the present application. The method comprising the following steps:

Step S301, constructing a simulation verification environment for the system on chip;

Step S303, creating a bus function model unit, and binding the bus function model unit to an interface via which a central processing unit is connected to the bus;

Step S305, creating an Universal Verification Methodology test instance, and performing the Universal Verification Methodology test instance by the bus function model unit to implement the system on chip test;

Step S307, creating a plurality of software test instances;

Step S309, compiling the software test instances, and performing the compiled software test instances by the central processing unit to implement the system on chip test.

In the present embodiment, the system on chip comprises one or more central processing units $CPU_0$, $CPU_1$, ..., $CPU_k$, a plurality of IP core modules $IP_1$, $IP_2$, ..., $IP_n$ and the bus, each of the IP core modules is connected to the bus, the central processing units are connected to the bus. One or more bus function model units $BFM_0$, $BFM_1$, ..., $BFM_k$ are created, each bus function model unit is bound to an interface via which the corresponding central processing unit is connected to the bus, and the Universal Verification Methodology test instance is connected to the bus through the corresponding bus function model unit. The Universal Verification Methodology test can realize random test and improve the test coverage.

In an embodiment, before the step S303 of binding the bus function model unit to an interface via which a central processing unit is connected to the bus, the method further comprises: disabling the connection between the central processing unit and the bus, so that the connection between the central processing units and the bus will not work when the Universal Verification Methodology test instance is tested through the bus function model unit. It should be noted that in this embodiment, the plurality of central processing units $CPU_0$, $CPU_1$, ..., $CPU_k$ are independent, that is, a part of the connection between the central processing units and the bus can be enabled for executing the software test instances, and a part of the connection between the central processing units and the bus can be disabled for binding the bus function model.

In an embodiment, the number of the system on chip test implemented by the Universal Verification Methodology test instances is more than that implemented by the central processing units, that is, most tests (for example, greater than 80%) are implemented through the UVM case path, and a small part tests (for example, less than 20%) is implemented through the CPU path.

In an embodiment, before the step S309 of compiling the plurality of software test instances, and performing the compiled software test instances by the central processing unit to implement the system on chip test, the method further comprises selecting a direct programming interface (DPI) and the corresponding bus function model unit to perform a part of the software test instances; and compiling the remaining part of the software test instances and performing the compiled remaining part of the software test instances by the central processing unit. Among them, the bus function model unit selects the direct programming interface to execute most of the software test instances (for example, more than 80%), and selects the central processing unit to execute a small part of the software test instances (for example, less than 20%). That is, before the implementation of the CPU path, the software tests can be implemented via the DPI path, and most of the software tests can be implemented via the DPI path, and a small part of software tests can be implemented via the CPU path.

In an embodiment, when the Universal Verification Methodology test instances are performed by the bus function model unit to implement the test of the system on chip, establishing connection between the direct programming interface and the bus function model unit to perform a part of the software test instances, that is, when testing via the UVM case path, the DPI path can be implemented in the simulation environment at the same time.

In an embodiment, when selecting the direct programming interface through the bus function model unit to perform a part of the software test instances, booting the central processing unit to perform the compiled software test instances, that is, when testing via the UVM case path or testing the software test instances via the DPI path, the CPU path can be implemented in the simulation environment at the same time.

In the present embodiment, most of the functions (e.g., 90% or more) can be firstly tested through the bus function model units using the Universal Verification Methodology test instances, and then with regard to a small part functions (for example, less than 10%) that cannot be implemented by the Universal Verification Methodology test instances, creating the software test instances, compiling the software test instances, booting the central processing unit to perform the compiled software instances. In this embodiment, the coverage rate of verification can be guaranteed, while the complexity of verification is reduced, and the verification period is shortened. In addition, before realizing the CPU path, the software test instances in C language can be created as needed, and tested through the bus function model and the direct programming interface.

It should be noted that in the application documents of the present application, relational terms such as first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a plurality of elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In the application file of this application, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc., expressions include 2, twice, 2 types, and 2 or more, twice or more, and 2 types or more types.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

What is claimed is:

1. A verification platform for a system on chip, comprising:
   at least one test module, wherein each test module comprising a central processing unit, a bus function model unit and an Universal Verification Methodology test instance, the central processing unit being connected to the bus, the bus function model unit being bound to an interface via which the central processing unit is connected to the bus;
   wherein the Universal Verification Methodology test instance implements a test through the bus function model unit, and a software test instance implements a test through the central processing unit or through the bus function model unit and a direct programming interface.

2. The verification platform for system on chip according to claim 1, further comprising a first selection switch, wherein one of the central processing unit and the bus function model unit is selectively connected or bound to an interface of the bus through the first selection switch.

3. The verification platform for system on chip according to claim 1, further comprising a second selection switch, wherein one of the direct programming interface and the Universal Verification Methodology test instance is selectively connected to the bus function model unit through the second selection switch.

4. The verification platform for system on chip according to claim 1, wherein the system on chip comprises one or more central processing units, a plurality of IP core modules and a bus, wherein each of the IP core modules is respectively connected to the bus, the one or more central processing units are connected to the bus.

5. A verification method for system on chip, comprising:
   constructing a simulation verification environment for the system on chip;
   creating a bus function model unit, and binding the bus function model unit to an interface via which a central processing unit is connected to the bus;
   creating an Universal Verification Methodology test instance, and performing the Universal Verification Methodology test instance by the bus function model unit to implement the system on chip test;
   creating a plurality of software test instances; and
   compiling the software test instances, and performing the compiled software test instances by the central processing unit to implement the system on chip test.

6. The verification method for system on chip according to claim 5, wherein before the step of binding the bus function model unit to the same interface at which a central processing unit being connected to the bus, further comprising: disabling the connection between the central processing unit and the bus.

7. The verification method for system on chip according to claim 5, wherein before the step of compiling the software test instances, and performing the compiled software test instances by the central processing unit to implement the system on chip test, further comprising: selecting the bus function model unit to perform a part of software test instances through the direct programming interface; and then compiling the remaining part of the software test instances and performing the compiled remaining part of software test instances by the central processing unit.

8. The verification method for system on chip according to claim 7, wherein when the Universal Verification Methodology test instance is performed by the bus function model unit to implement the test of the system on chip, establishing connection between the direct programming interface and the bus function model unit to perform a part of the software test instances.

9. The verification method for system on chip according to claim 7, wherein when selecting the bus function model unit to perform a part of the software test instances through direct programming interface, compiling the software test instances and booting the central processing unit to perform the compiled software test instances.

10. The verification method for system on chip according to claim 5, wherein the number of the system on chip tests implemented by the Universal Verification Methodology test instances is more than that implemented by the central processing unit.

* * * * *